United States Patent [19]

Oh

[11] Patent Number: 5,729,351
[45] Date of Patent: Mar. 17, 1998

[54] METHOD FOR PROCESSING PRINT INFORMATION OF PAGE PRINT APPARATUS

[75] Inventor: Young-Dall Oh, Seoul, Rep. of Korea

[73] Assignee: SamSung Electronics Co., Ltd., Paldal-ku, Rep. of Korea

[21] Appl. No.: 630,209

[22] Filed: Apr. 10, 1996

[30] Foreign Application Priority Data

Jun. 17, 1995 [KR] Rep. of Korea ............... 16168/1995

[51] Int. Cl.⁶ .................................................. H04N 1/00
[52] U.S. Cl. .................................... 358/296; 358/406
[58] Field of Search ............................. 347/110, 131; 358/296, 504, 406; 399/10, 29, 27, 25, 24, 252, 253, 181

[56] References Cited

U.S. PATENT DOCUMENTS

| | | | |
|---|---|---|---|
| 4,566,547 | 1/1986 | Furukawa | 177/46 |
| 4,583,834 | 4/1986 | Seko et al. | 355/14 |
| 4,748,479 | 5/1988 | Ohira | 355/72 |
| 4,951,091 | 8/1990 | Nawata | 399/27 |
| 5,160,966 | 11/1992 | Shiina et al. | 399/27 |
| 5,202,769 | 4/1993 | Suzuki | 358/300 |
| 5,204,698 | 4/1993 | LeSueur | 347/140 |
| 5,383,004 | 1/1995 | Miller et al. | 399/24 |
| 5,459,556 | 10/1995 | Acquaviva et al. | 399/58 |
| 5,508,786 | 4/1996 | Ogiri et al. | 399/43 |

*Primary Examiner*—Edward Tso
*Assistant Examiner*—Gregory J. Toatley, Jr.
*Attorney, Agent, or Firm*—Robert E. Bushnell, Esq.

[57] ABSTRACT

A process and apparatus for generating and displaying the number of printed sheets of paper and the print ratio occupied by black pixels on the print paper in a page printing apparatus. The apparatus stores print data corresponding to one page in a page memory upon initiation of a print mode, calculates a print ratio of black pixels with respect to an overall area of a print paper, updates the number of printed sheets of paper and the print ratio of black pixels thereto, and accumulatively stores the updated number of printed sheets of paper and the print ratio in a statistic memory. A current time is checked upon initiation of a timer interrupt mode, the daily-average number of printed sheets of paper and the daily-average print ratio are updated on the basis of the current number of printed sheets of paper and the current print ratio stored in the statistic memory at the end of each day, and the updated daily-average number of printed sheets of paper and the updated daily-average print ratio of black pixels are stored in the statistic memory. The monthly-average number of printed sheets of paper and the monthly-average print ratio are updated on the basis of the daily-average number of printed sheets of paper and the daily print ratio stored in the statistic memory at the end of each month, and the monthly-average number of printed sheets of paper and the monthly-average print ratio, the daily-average number of printed sheets of paper and the daily-average print ratio, and the current number of printed sheets of paper and the current print ratio stored in the statistic memory may be displayed upon selection of an output mode by a user.

16 Claims, 4 Drawing Sheets

METHOD FOR PROCESSING PRINT INFORMATION OF PAGE PRINT APPARATUS

CROSS-REFERENCE TO RELATED APPLICATION

This application makes reference to, incorporates the same herein, and claims all benefits accruing under 35 U.S.C. §119 from an application for Method For Processing Print Information Of Page Print Apparatus earlier filed in the Korean Industrial Property Office on 17 Jun. 1995 and there duly assigned Ser. No. 4459/1995.

BACKGROUND OF THE INVENTION

1. Technical Field

The present invention relates to an apparatus and process for processing print information, and more particularly to an apparatus and process for displaying the number of printed sheets of paper and the print ratio of the printed black pixels with respect to an overall area of a paper in conjunction with printing of images represented by the information.

2. Background Art

As electrophotographic printing machines such as a laser beam printer and facsimile machine become more complex and versatile in operation with greater speed, there is a greater demand for higher performance and reliability. A suitable control system must be able not only coordinate the operation of the various components of the machine such as a developing unit containing toner and its carrier, but also to internally monitor machine operation and provide information for prompt component replacement, maintenance, and repair. Many manufacturers of these conventional electrophotographic printing machines typically provide counters for counting the number of sheets of print paper (e.g., A4 paper), and a display unit for displaying the number of printed sheets of paper in order to predict the need to replace the toner of the developing unit after a given number of prints. Other printing machines such as those disclosed, for example, in U.S. Pat. No. 4,951,091 for Image Forming Apparatus Having Toner Quantity Detection Means issued to Nawata, provide a visual display of a message "TONER LOW" to alert the user to replace the toner when the residual amount of toner contained in the developing unit has reached a predetermined level. It is, however, impossible for the user to determine how much longer can such a printing machine continue to print, or how many more sheets of paper can be printed after the message of "TONER LOW" is displayed.

While the toner usage depends on the number of papers printed, the number of prints varies depending on the images printed and the density covered, or preferably the number of pixels to be toned. In U.S. Pat. No. 5,160,966 for Apparatus For Detecting Toner Shortage In Developing Unit, Shiina et al., seek to detect and indicate toner shortage in the developing unit by counting the number of prints as well as the number of pixels in the print data. In Shiina '966, a counter is provided to count in a cumulative manner the number of image prints and the number of pixels in the print data upon detection of toner shortage in order to stop the printing operation when the cumulative counting value of either the number of image prints or the number of pixels has reached a predetermined value.

U.S. Pat. No. 5,202,769 for Digital Electrostatic Printing Apparatus Using A Counted Number Of Pixels Of Various Densities To Determine And Control An Amount Of Toner Used During Image Development issued to Suzuki, discloses a pixel counting process. The toner usage per paper depends primarily on the percent of the paper that is covered by toner and the density of the covered area. In electrophotographic printers where the document is scanned, the black pixels, which represent portions of the text, may be used as an indicator of the amount of toner to be used. The pixel counting system of Suzuki '769 is used to count the number of pixels contained in the multi gradation digital image data for each density gradation, and to calculate toner consumable based the counted number of pixels. In Suzuki '769, the calculated toner consumable amount is used to allow the toner amount in the developing unit to be maintained at a certain level; however, it can not be used to determine the current toner level contained in the developing unit in order to alert the user of the occurrence of a toner shortage.

For instance, U.S. Pat. No. 5,204,698 for Toner Monitoring In An Electrostatographic Digital Printing Machine issued to LeSueur et al., discloses a laser printer in which the number of pixels to be toned is used as an indication for the rate at which toner is being depleted from the developing unit. The device for dispensing fresh toner is operated in dependence on the number of pixels to be toned so that there is a pre-established relationship between the pixel count and the length of time for which the dispensing device is in operation. If the efficiency of the dispensing device falls, the pre-established relationship is adjusted so that the toner density in the developed images remains constant. If the predetermined level of adjustment is reached, it is taken as an indication that the supply of toner is the printer is low, and the toner should be replenished.

Recently, U.S. Pat. No. 5,459,556 for Toner Consumption Rate Gauge For Printers And Copiers issued to Acquaviva et al., discloses a toner meter comprising a controller for determining a rate of toner usage per print, an average toner consumable rate, and toner consumable life in a printer of the type having operator actuable settings effecting the rate of toner usage per print, and an indicator for indicating the calculated rate of toner usage. While the conventional printing machines disclosed, for example, in Acquaviva '556 and LeSueur '698 are capable of alerting the user of toner shortage and predicting the need to replace the toner contained in the developing unit after a given number of prints, it has been my observation that further improvements can be contemplated. Accordingly, I have discovered a cost effective way in which individual consumable unit such as toner can be timely replaced at the end of its useful life.

SUMMARY OF THE INVENTION

It is therefore an object of the present invention to provide an improved printer and process for processing information in conjunction with the printing of images related to that information.

It is another object to provide a page printing apparatus and process capable of processing print information to inform a user the need to replace individual consumable unit such as toner at the end of its useful life.

It is yet another object to provide a page printing apparatus and process capable of processing print information for displaying the number of printed sheets of paper and the print ratio of black pixels relative to an overall size of paper.

It is also an object to provide a page print apparatus and process capable of determining a current number of printed sheets of paper and a print ratio of black pixels relative to an overall size of paper, determining a daily-average number of printed sheets of paper and a daily-average print ratio thereto, and a monthly-average number of printed sheets of paper and a monthly-average print ratio.

It is a further object to provide a page printer and process able to provide a user with a real-time visual representation of a date for replenishing or replacing items consumed during the formation of images upon printable media.

These and other objects of the present invention can be achieved when processing print information of a page printing apparatus by storing print data corresponding to one page in a page memory upon initiation of a print mode, calculating a print ratio of black pixels with respect to an overall area of a print paper, updating the number of printed sheets of paper and the print ratio of black pixels thereto, and accumulatively storing the updated number of printed sheets of paper and the print ratio in a statistic memory. The current time upon initiation of a timer interrupt mode is checked, the daily-average number of printed sheets of paper and the daily-average print ratio on the basis of the current number of printed sheets of paper and the current print ratio is stored in the statistic memory at the end of each day. The updated daily-average number of printed sheets of paper and the updated daily-average print ratio of black pixels are stored in the statistic memory; the monthly-average number of printed sheets of paper and the monthly-average print ratio on the basis of the daily-average number of printed sheets of paper are updated and the daily print ratio stored in the statistic memory at the end of each month, and the monthly-average number of printed sheets of paper and the monthly-average print ratio, the daily-average number of printed sheets of paper and the daily-average print ratio are visually displayed. The current number of printed sheets of paper and the current print ratio are stored in the statistic memory upon initiation of an outputting mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
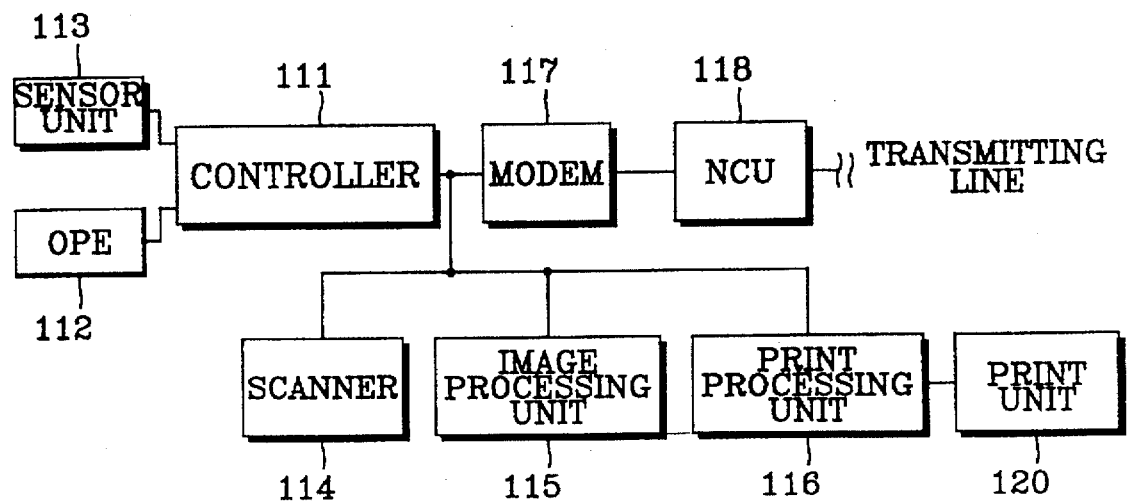
FIG. 1 illustrates a page printing apparatus constructed according to the principles of the present invention.

Referring now to the drawings and particularly to FIG. 1, which illustrates a page printing apparatus constructed according to the principles of the present invention. Generally, the page printing apparatus can be a laser beam printer or a facsimile system using plain paper. For the sake of clarity, however, the page printing apparatus as will be described in this invention is intended to be a facsimile system using plain paper. As shown in FIG. 1, the facsimile system includes a controller 111 for controlling the overall operation of the facsimile system including a transmission mode, a reception mode, and a copying mode in accordance with a set program. In addition, the controller 111 also includes a program memory and a data memory for storing an application program and data generated from the execution of the application program, respectively. An operating panel OPE 112 including a key input unit and a display unit is typically located on an exterior surface of such a facsimile system. The key input unit of the OPE 112 is connected to the controller 111 for allowing a user to control the operation of the facsimile system in each of the transmission mode, the reception mode and the copying mode. The display unit of the OPE 112 is also connected to the controller 111 for providing a visual display of the selected mode of operation of the facsimile system. A sensor unit 113 senses whether a print paper is input and a document of one page or a plurality of pages to be printed is input, and generates a sensed signal to the controller 111 alerting the facsimile system of an imminent printing operation including either the transmission, reception, or copying of a document. A scanner 114 receives the input document, scans and generates an image signal corresponding to the image read from the document.

Upon the transmission mode or the copying mode, an image processing unit 115 processes the image signal output from the scanner 114 under the control of the controller 111. Upon the reception mode, however, the image processing unit 115 processes an image signal received from a transmission line. Upon the reception mode and the copying mode, a print processing unit 116 receives the image data processed from the image processing unit 115 under the control of the controller 111, controls a print unit 120 for printing the image data onto a print paper. Upon the transmission mode, a modem 117 transforms the image data into a transmission format, transmits the transformed image data to the image processing unit 115 under the control of the controller 111 for signal processing. Upon the reception mode, the modem 117 demodulates the image signal processed from the image processing unit 115. A network control unit NCU 118 is connected to the transmission line for forming a transmission and reception path of the modem 117 under the control of the controller 111.

Figure 2:
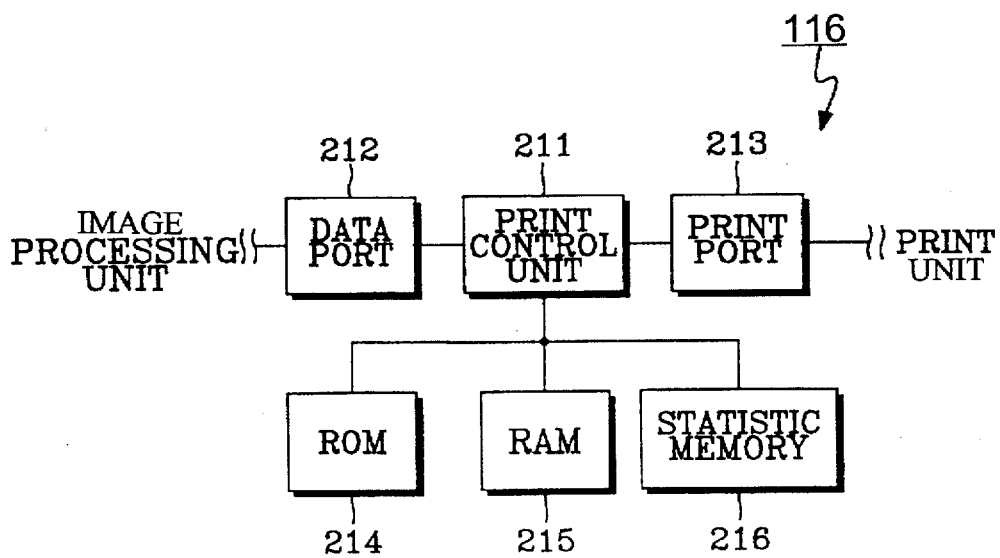
FIG. 2 illustrates a print processing unit of the page printing apparatus of FIG. 1.

Turning now to FIG. 2 which illustrates a construction of the print processing unit 116 of the facsimile system of FIG. 1. The print processing unit 116 includes a data port 212 for receiving image data processed from the image processing unit 115, a print control unit 211 for processing the image data for printing, a print port 213 for sending the print data to the print unit 120 for printing, a read-only-memory ROM 214 for storing a print program, a random-access-memory RAM 215 for temporarily storing print data generated from operating the print program, and a statistical memory 216 for storing statistical print information such as, the current number of printed sheets of paper, its print ratio of black pixels relative to the size of the paper and the current average print ratio of the current number of printed sheets of paper, the daily-average number of printed sheets of paper and the daily-average print ratio, and the monthly-average number of printed sheets of paper and the monthly-average print ratio as contemplated by the present invention.

The data port 212 is connected to the image processing unit 115 and the controller 111 of the facsimile system in order to receive the image data processed from the image processing unit 115 in response to control data generated from the controller 111 for print preparation. The print control unit 211 is connected to the data port 212, the ROM 14, the RAM 215, and the statistical memory 216, for converting the image data received from the data port 212 into print format. The RAM 215 as contemplated by the present invention includes a page memory area for storing the image data in a unit of page, and can be embodied with a dynamic random access memory DRAM. The statistic memory 216 is configured to contain an area of storing the current number of printed sheets of paper, an area of storing the current print ratio of black pixels relative to the print paper, an area of storing the daily-average number of printed sheets of paper, an area of storing the daily-average print ratio of black pixels thereto, an area of storing the monthly-average number of printed sheets of paper, and an area of storing the monthly-average print ratio of black pixels thereto. In addition, the statistic memory 216 is a nonvolatile type capable of retaining print information even when the power is off. The print port 213 is connected to the print unit 120 for sending print data to the print unit 120 under the control of the print control unit 211 for printing.

In the above construction, the number of overall pixels relative to the print paper is in a unit of page; that is, the page memory contained in the RAM 215 has the memory capacity sufficient to store pixels in the image data corresponding to, for example, a A4 paper. As contemplated by the present invention, the counting of black pixels in the image data corresponding to one page in order to determine the current print ratio of black pixels relative to the size of the print paper, the daily-average or the monthly-average print ratio can be implemented by hardware or software. In the case of hardware, such a counting method may be constructed with a comparing unit for comparing the print data received in a unit of byte with a standard value set for each of the black pixels and white pixels, a counting unit for counting the number of black pixels generated in the comparing unit, and an adding unit for adding the black pixels counted in the counting unit with each other. In the case of software, by contrast, such a counting method may be configured with a bit map (for example, 00000000-11111111) in a unit of byte, for enabling the counting of the number of black pixels in the image data by associating the image data with the bit map by a unit of byte. The construction as described above may be implemented as part of the print control unit 211, or alternatively, part of the overall print processing unit 116. Moreover, although the counting unit is intended to count the black pixels in the print data, a counter for counting pixels of other colors and density gradations may be constructed to effectuate the principles of the present invention.

Figure 3:
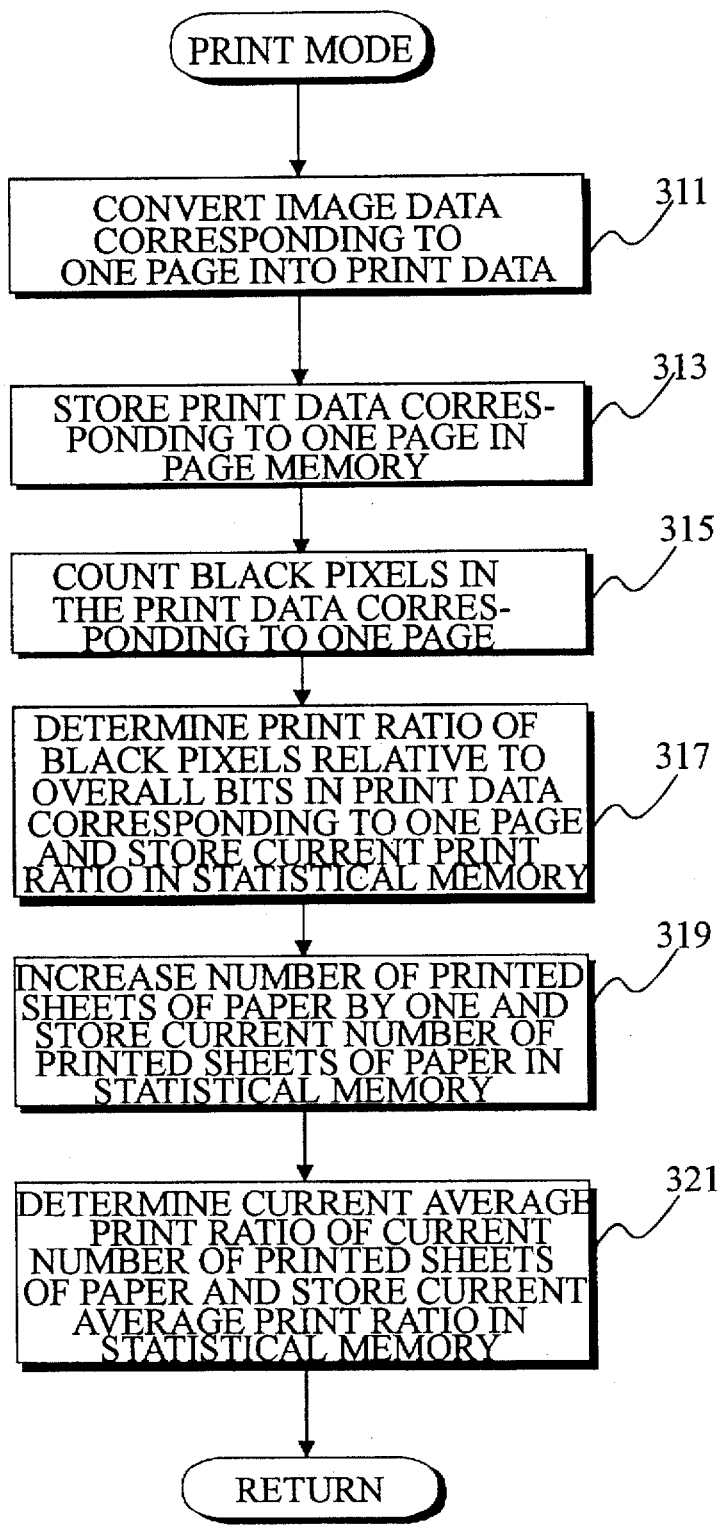
FIG. 3 illustrates a process of determining the current number of printed sheets of paper and the current print ratio of black pixels relative to the overall size of print paper by the page printing apparatus constructed according to the present invention.

FIG. 3 illustrates a process of determining the current number of printed sheets of paper and the current print ratio of black pixels relative to the overall size of print paper by a page printing apparatus in which the number of black pixels in the print data corresponding to one page is counted to determine the print ratio of black pixels relative the size or an overall bit number in the print data. Referring now to FIG. 3, when the image data is received at the data port 212, the print control unit 211 converts the image data corresponding to one page into print data of a print format at step 311. That is, the print control unit 211 performs functions of magnifying, curtailing, coding, and decoding the image data and converts the results into the print data. After that, the print control unit 211 stores the print data corresponding to one page in the page memory area of the RAM 215 at step 313, counts the number of black pixels in the print data corresponding to one page stored in the page memory area at step 315. After step 315, the print control unit 211 determines the current print ratio of black pixels in the print data by contrasting the number of black pixels with the number of overall bits of the print data corresponding to one page, and stores the current print ratio in the statistical memory 216 at step 317. After determining the print ratio of the current sheet of paper as described above, the print control unit 211 increases the number of printed sheets of paper by one and stores the increased current number of printed sheets of paper in the statistic memory 216 at step 319. Once the current number of printed sheets of paper is determined, the print control unit 211 determines the current average print ratio of the current number of printed sheets of paper based on all preceding print ratios determined for each day up to 24 hours, and stores the result in the statistic memory 216 at step 321. After the current number of printed sheets of paper and the current print ratio are stored in the statistical memory 216, the print control unit 211 controls the print unit 120 to print the print data corresponding to a current page.

Upon initiation of the print mode as mentioned previously, the print control unit 211 counts the number of black pixels in the image data received in a page-by-page unit, and determines the print ratio of black pixels relative to the overall size of print paper. In addition, the print control unit 211 accumulatively calculates and stores the current number of printed sheets of paper and the current average print ratio of black pixels by using print information of the calculated page. As contemplated by the present invention, the current number of printed sheets of paper represents the number of printed sheets of paper accumulatively stored for 24 hours. Other time frames may, however, be included. For example, the current number of printed sheets of paper may represent the number of printed sheets of paper accumulative stored since the installation or replacement of a particular consumable unit such as a toner. The current average print ratio, on the other hand, indicates the ratio of black pixels in contrast with the overall size of print paper used in the current number of printed sheets of paper.

Figure 4:
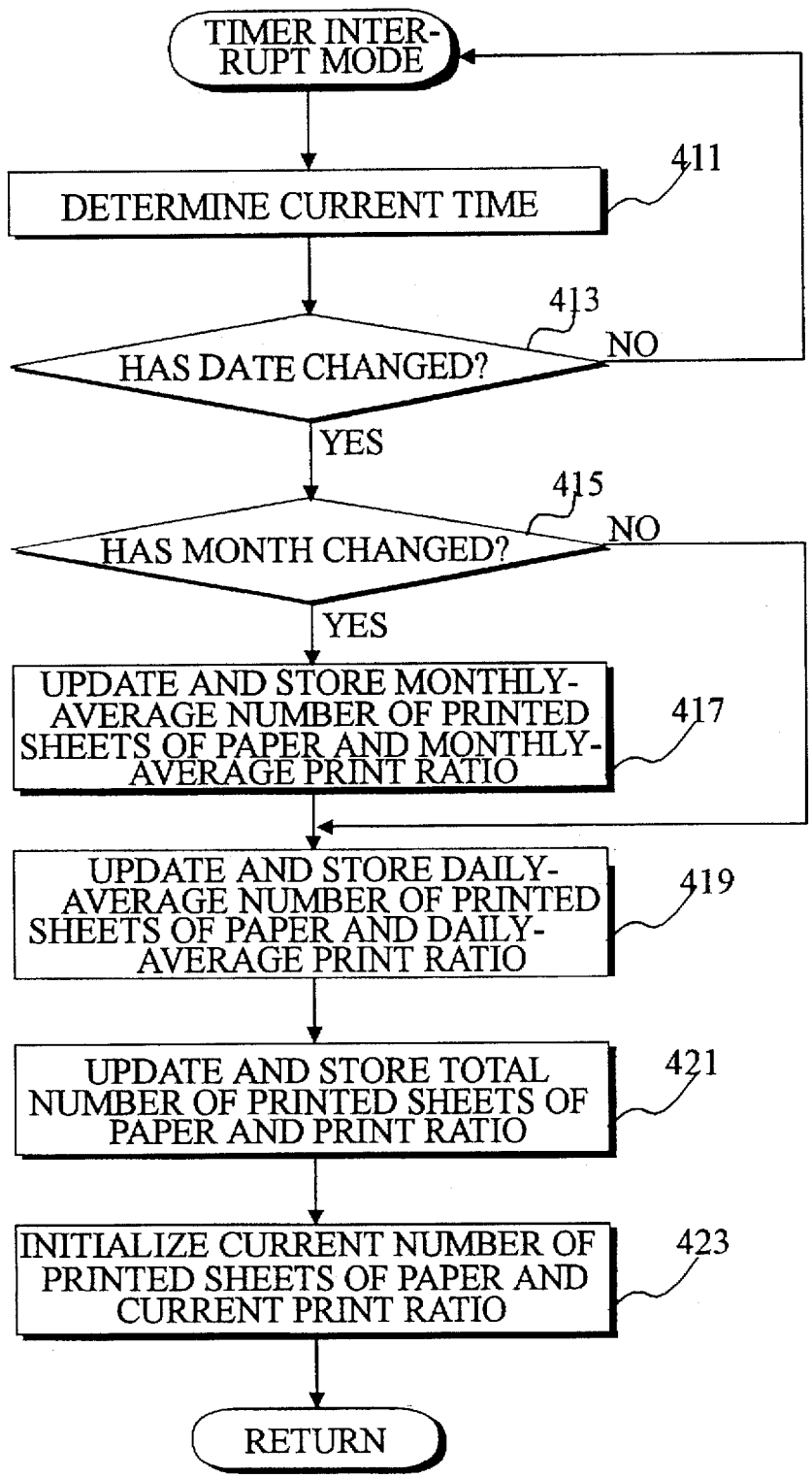
FIG. 4 illustrates a process of determining the daily-average number of printed sheets of paper and the daily-average print ratio of black pixels relative to an overall print paper, the monthly-average number of printed sheets of paper and the monthly-average print ratio by a page printing apparatus constructed according to the present invention.

FIG. 4 illustrates a process of determining the daily-average number of printed sheets of paper and the daily-average print ratio of black pixels relative to an overall print paper, the monthly-average number of printed sheets of paper and the monthly-average print ratio by a page printing apparatus constructed according to the present invention. The print control unit 211 operates to accumulatively store the number of printed sheets of paper and the print ratio of black pixels so that the number of printed sheets of paper can be updated in real time upon initiation of a timer interrupt mode.

With reference to FIG. 4, when the timer interrupt mode is initiated, the print control unit 211 determines the current time of the system by adding a current timer interrupt period to a time value determined previously at step 411. Once the current time is determined, the print control unit 211 checks, at step 413, whether there is a change in date based on a 24 hours period as a result from the current time and the previously determined time. If there is no change in the date, the print control unit 211 awaits the generation of a next timer interrupt. If there is a change in date, however, the print control unit 211 checks, at step 415, whether there is a change in month i.e., whether the changing data is a first date of next month. Here, it is worth noting that the change in month is dependent upon the number of days in each month from January to December; consequently, the first date of the next month may be changed according to the number of days available in each month, which can be controlled with a calender table. When there is no change in month, the print control unit 211 proceeds to step 419 to update the daily-average number of printed sheets of paper on the basis of the current number of printed sheets of paper and the daily-average print ratio of black pixels relative to the print data in the daily-average number of printed sheets of paper stored in the statistical memory 216 and store the update information in the statistical memory 216. As described earlier, the daily-average number of printed sheets of paper represents an average number of printed sheets of paper determined on daily basis and is calculated from the time when the consumable unit such as toner is installed till the present time on the basis of the current number of printed sheets of paper. The daily-average print ratio, on the other hand, represents the ratio that black pixels are occupied in contrast with the overall size of the print paper in the daily-average number of printed sheets of paper. After that, the print control unit 211 updates the total number of printed sheets of paper and the print ratio of black pixels in the print data corresponding to a current page and stores the updated information at step 421. Once the total number of printed sheets of paper and the print ratio are updated at step 421, the print control unit 211 initializes the current number of printed sheets of paper and the current average print ratio of black pixels at step 423 in order to be ready for the next exchanging date.

When there is a change in month at step 415, however, the print control unit 211 updates the monthly-average number of printed sheets of paper on the basis of the number of printed sheets of paper used for each month and the monthly-average print ratio of black pixels relative to the print data in the monthly-average number of printed sheets of paper stored in the statistical memory 216 and store the update information in the statistical memory 216. The monthly-average number of printed sheets of paper represents a monthly-average number of printed sheets of paper which has been printed from the time when the consumable unit such as a toner is replaced to the present on the basis of the current number of printed sheets of paper and the daily-average number of printed sheets of paper. By contrast, the monthly-average print ratio of black pixels represents the monthly-average print ratio that black pixels are occupied in contrast with the overall size of the print paper in the monthly-average number of print paper sheets. After determining the monthly-average number of print paper sheets and print ratio of black pixels, the print control unit 211 proceeds to step 419 in order to calculate the daily-average number of print paper sheets and the daily-average print ratio before updating the total number of printed sheets of paper and the print ratio of black pixels in the print data corresponding to a current page and storing the updated information at step 421. Again, once the total number of printed sheets of paper and the print ratio are updated at step 421, the print control unit 211 initializes the current average number of print paper sheets and print ratio of black pixels and is ready to enable the information for the changing date to be calculated again in step 423.

Figure 5:
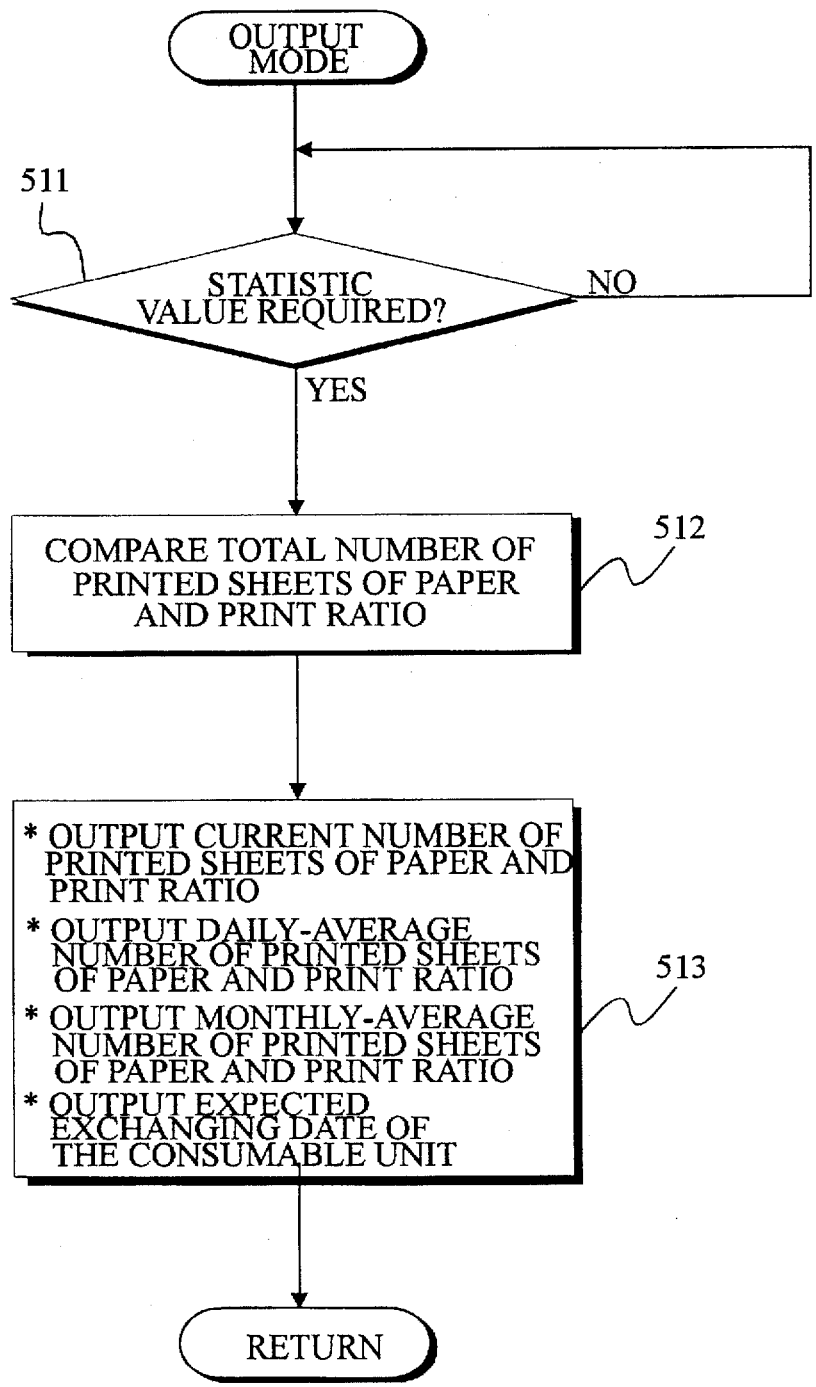
FIG. 5 illustrates a process of displaying print information relating to the current number of printed sheets of paper and the current print ratio, the daily-average number of printed sheets of paper and the daily-average print ratio, and the monthly-average of printed sheets of paper and the monthly-average print ratio in a page printing apparatus, upon a user's command.

FIG. 5 illustrates a process of displaying print information relating to the current number of printed sheets of paper and the current print ratio, the daily-average number of printed sheets of paper and the daily-average print ratio, and the monthly-average of printed sheets of paper and the monthly-average print ratio in a page printing apparatus, upon initiation of an output mode a user's command.

As shown in FIG. 5, after the current number of printed sheets of paper and the current print ratio of the current number of printed sheets of paper are initialized, the user may, in step 511 via manual manipulation of a key on operating panel 112, request statistical values stored in statistical memory 216. In response, print control unit 211 compares such print information with a predefined value set by the consumable unit's manufacturer, and a visual display of the result printed up to the present time. In this case, the predefined value set by the manufacturer is referred to as the number of black pixels to the print paper in a unit of page having a printing ratio of 10% or 20%. Therefore, when comparing the print information for the total number of sheets of paper and average print ratio with the predefined value, the print control unit 211 generates the total number of printed sheets of paper printed between installation of the consumable unit in current use (e.g., the toner cartridge still resident within the printer) and the present time and the average print ratio over the same interval, so that the proper time remaining before the necessity for replacing a consumable unit such as a toner cartridge can be accurately computed. Typically, each consumable unit used in the page printing apparatus including toner, has a manufacturer's life expectancy for which the replacement time can be determined. Accordingly, the proper time for removal and replacement of a consumable unit may be determined by comparing the total number of printed sheets of paper that have been printed by the currently installed consumable unit and the average print ratio, with the lifetime of the consumable unit which is provided by that consumable unit's manufacturer to the user, on the basis of the printed sheets of paper and the average block pixel ratio as calculated.

Referring again to FIG. 5, once the user generates a key signal requiting a statistic value stored in the statistical memory 216 by way of an operating panel 112 at step 511, the controller 111 generates control data for controlling the print processing unit 116 to process the image data received from the image processing unit 115 and to determine the statistical print information such as, for example, the current number of printed sheets of paper, the current print ratio of black pixels relative to the size of the paper and the current average print ratio of the current number of printed sheets of paper, the daily-average number of printed sheets of paper and the daily-average print ratio, and the monthly-average number of printed sheets of paper and the monthly-average print ratio in order to determine the total number of printed sheet and the average print ratio at step 512. When the print control unit 211 of the print processing unit 116 receives the control data from the controller 111 via the data port 212, the print control unit 211 provides, at step 513, a visual display of the statistical print information including the current number of printed sheets of paper and the current print ratio of black pixels relative to the size of the paper, the daily-average number of printed sheets of paper and the daily-average print ratio, the monthly-average number of printed sheets of paper and the monthly-average print ratio as well as the expected date of replacement of the consumable unit in question.

As apparent form the foregoing, there are advantages in that since the page printing apparatus has a statistic function of informing the user of the useful life of the consumable unit including toner, the proper time for replacing such consumable unit based on the print information regarding to the daily-average, monthly-average, and even yearly-average useful life of printing paper using such a consumable unit.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for processing print information of a page printing apparatus, said method comprising the steps of:

storing print data corresponding to one page in a page memory upon initiation of a print mode;

determining a print ratio of black pixels relative to an overall area of print paper in said print data corresponding to one page;

updating the number of printed sheets of paper and the print ratio of black pixels thereto;

accumulatively storing the current number of printed sheets of paper and the current print ratio in a statistic memory;

checking a current time upon initiation of a timer interrupt mode;

updating the daily-average number of printed sheets of paper and the daily-average print ratio on the basis of the current number of printed sheets of paper and the current print ratio stored in said statistic memory at the end of each day;

storing the updated daily-average number of printed sheets of paper and the updated daily-average print ratio of black pixels in said statistic memory;

updating the monthly-average number of printed sheets of paper and the monthly-average print ratio on the basis of the daily-average number of printed sheets of paper and the daily print ratio stored in said statistic memory at the end of each month; and displaying the monthly-average number of printed sheets of paper and the monthly-average print ratio, the daily-average number of printed sheets of paper and the daily-average print ratio, and the current number of printed sheets of paper and the current print ratio stored in said statistic memory upon initiation of an output mode.

2. The method of claim 1, further comprised of said print ratio being determined by counting the number of black pixels in the print data corresponding to one page and comparing the counted black pixels with overall bits of the print data.

3. A method for processing print information of a page printing apparatus, comprising the steps of:

receiving print data corresponding to one page for printing preparation;

storing said print data corresponding to one page in a page memory;

determining a print ratio of black pixels relative to an overall area of print paper in said print data corresponding one page;

determining a number of printed sheets of paper on the basis of each reception of said print data corresponding one page; and storing the number of printed sheets of paper and the print ratio in a statistic memory.

4. The method of claim 3, further comprised of said print ratio being determined by counting the number of black pixels in the print data corresponding to one page and comparing the counted black pixels with overall bits of the print data.

5. The method of claim 3, further comprising:

determining the daily-average number of printed sheets of paper and the daily-average print ratio on the basis of the current number of printed sheets of paper and the current print ratio;

accumulatively storing the daily-average number of printed sheets of paper and the daily-average print ratio of black pixels in said statistic memory;

determining the monthly-average number of printed sheets of paper and the monthly-average print ratio on the basis of the daily-average number of printed sheets of paper and the daily print ratio stored in said statistic memory; and accumulatively storing the monthly-average number of printed sheets of paper and the monthly-average print ratio of black pixels in said statistic memory.

6. The method of claim 4, further comprising:

analyzing a current time;

updating the daily-average number of printed sheets of paper and the daily-average print ratio of black pixels on the basis of the current number of printed sheets of paper and the current print ratio of black pixels stored in said statistic memory at the end of each day;

accumulatively storing the updated daily-average number of printed sheets of paper and the updated daily-average print ratio in said statistic memory;

updating the total number of printed sheets of paper and the average print ratio of black pixels on the basis of the current number of printed sheets of paper and the current print ratio of black pixels;

storing the updated total number of printed sheets of paper and the updated average print ratio in said statistic memory;

comparing print information relating to the updated total number of printed sheets of paper and the updated average print ratio with predetermined information; and displaying the print information.

7. A print control apparatus for processing print information in a page printer, comprising:

controller means for determining a number of printed sheets of paper on the basis of each reception of print data corresponding to one page and a print ratio of black pixels relative to overall pixels contained in said print data corresponding to said one page; and means, in communication with said controller means, for providing a visual display of the number of said printed sheets of paper and said print ratio of black pixels.

8. The print control apparatus of claim 7, comprised of said controller means determining said print ratio by making a count of said number of black pixels in said print data corresponding to one page and comparing said count of black pixels with a cumulative number of pixels contained in said print data.

9. The print control apparatus of claim 7, further comprised of said controller means determining a daily-average number of printed sheets of paper and a daily-average print ratio on a basis of the current number of printed sheets of paper and said current print ratio, and accumulatively storing said daily-average number of printed sheets of paper and said daily-average print ratio of black pixels.

10. The print control apparatus of claim 9, further comprised of said controller means determining a monthly-average number of printed sheets of paper and a monthly-average print ratio on a basis of said daily-average number of printed sheets of paper and said daily print ratio, and accumulatively storing said monthly-average number of printed sheets of paper and said monthly-average print ratio of black pixels.

11. The print control apparatus of claim 10, further comprised of said controller means analyzing a current time, updating said daily-average number of printed sheets of paper and said daily-average print ratio of black pixels on a basis of said current number of printed sheets of paper and said current print ratio of black pixels stored in said statistic memory at an end of each day, generating an updated total number of printed sheets of paper and generating an updated average print ratio of black pixels on a basis of the current number of printed sheets of paper and a current print ratio of black pixels, determining whether toner applied to said printed sheets during said processing of print information needs to be replenished by making a comparison of said print information relating to said updated total number of printed sheets of paper and said updated average print ratio with reference data.

12. A printing apparatus, comprising:
a first memory for storing print data corresponding to each individual sheet of recording medium reflecting a document;
a second memory for storing therein information relating to a number of printed sheets of paper, a print ratio of black pixels relative to overall pixels contained in said print data corresponding to each individual sheet of recording medium;
an operational panel including a display unit for providing a visual display of operation of the printing apparatus, and a key input unit having a plurality of discrete keys that are independently operable by manual depression to generate different control functions; and
controller means for determining and storing the current number of printed sheets of recording medium and the current print ratio in said second memory on a basis of each reception of print data corresponding to each individual sheet of recording medium during a first mode of operation, and for determining and storing therein said second memory a daily-average number of printed sheets of recording medium and a daily-average print ratio on a basis of the current number of printed sheets of recording medium and the current print ratio, and a monthly-average number of printed sheets of recording medium and a monthly-average print ratio on a basis of the daily-average number of printed sheets of recording medium and the daily print ratio during a second mode of operation.

13. The printing apparatus of claim 12, further comprised of said controller means determining the print ratio by making a count of black pixels contained in said print data corresponding to each individual sheet of recording medium and comparing said count of black pixels with overall pixels contained in said print data.

14. The printing apparatus of claim 12, further comprised of said controller means providing a visual display of the monthly-average number of printed sheets of recording medium and the monthly-average print ratio, the daily-average number of printed sheets of recording medium and the daily-average print ratio, and the current number of printed sheets of recording medium and the current print ratio stored in said second memory on said display unit of said operational panel, when an output mode key from said key input unit is depressed by an operator.

15. The printing apparatus of claim 12, further comprised of said controller means analyzing a current time, updating the daily-average number of printed sheets of recording medium and the daily-average print ratio of black pixels on a basis of the current number of printed sheets of recording medium and the current print ratio of black pixels stored in said second memory at an end of each day.

16. The printing apparatus of claim 15, further comprised of said controller means further determining whether toner applied to said printed sheets of recording medium during processing of print data needs to be replenished by making a comparison of said information relating to the updated total number of printed sheets of recording medium and the updated average print ratio with reference data.

\* \* \* \* \*